United States Patent
Sacchetti et al.

(10) Patent No.: US 6,291,607 B1
(45) Date of Patent: *Sep. 18, 2001

(54) COMPONENTS AND CATALYSTS FOR THE POLYMERIZATION OF OLEFINS

(75) Inventors: Mario Sacchetti, Ferrara; Stefano Pasquali, Fossanova San Marco; Gabriele Govoni, Renazzo, all of (IT)

(73) Assignee: Montell Technology Company, Hoofddorp (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,750

(22) Filed: Jun. 27, 1997

Related U.S. Application Data

(62) Division of application No. 08/470,624, filed on Jun. 6, 1995, now Pat. No. 5,691,264.

(30) Foreign Application Priority Data

Jul. 8, 1994 (IT) ............................................... MI94A1421

(51) Int. Cl.[7] ............................. C08F 4/622; C08F 10/02
(52) U.S. Cl. ..................... 526/114; 526/113; 526/124.3; 526/124.9; 526/160; 526/348; 526/352; 526/943; 526/119; 502/113; 502/134
(58) Field of Search ..................................... 502/113, 118, 502/134; 526/113, 119, 123.1, 348, 352, 124.3, 124.9, 160, 943, 114

(56) References Cited

U.S. PATENT DOCUMENTS

| | | | |
|---|---|---|---|
| 4,399,054 | * | 8/1983 | Ferraris et al. .................. 252/429 B |
| 4,701,432 | * | 10/1987 | Welborn, Jr. ......................... 502/113 |
| 5,120,696 | * | 6/1992 | Tsutsui et al. ...................... 502/113 |
| 5,132,262 | | 7/1992 | Rieger et al. . |
| 5,139,985 | * | 8/1992 | Barbe et al. ........................ 502/109 |
| 5,162,278 | | 11/1992 | Razavi . |
| 5,183,867 | | 2/1993 | Welborn, Jr. . |
| 5,221,651 | * | 6/1993 | Sacchetti et al. ..................... 502/126 |
| 5,395,810 | * | 3/1995 | Shamshoum et al. ............... 502/113 |
| 5,422,386 | * | 6/1995 | Fries et al. ........................... 523/344 |
| 5,539,076 | * | 7/1996 | Nowlin et al. ...................... 526/348 |
| 5,604,170 | * | 2/1997 | Sano et al. .......................... 502/115 |

FOREIGN PATENT DOCUMENTS

| | | | |
|---|---|---|---|
| 318048 | * | 5/1989 | (EP) . |
| 0 318 048 | | 5/1989 | (EP) . |
| 0 395 083 | | 10/1990 | (EP) . |
| 412750 | * | 2/1991 | (EP) . |
| 0 412 750 | | 2/1991 | (EP) . |
| 0 436 328 | | 7/1991 | (EP) . |
| 0 436 399 | | 7/1991 | (EP) . |
| 0 439 964 | | 8/1991 | (EP) . |
| 0 447 070 | | 9/1991 | (EP) . |
| 0 447 071 | | 9/1991 | (EP) . |
| 447070 | * | 9/1991 | (EP) . |
| 0 485 820 | | 5/1992 | (EP) . |
| 0 485 822 | | 5/1992 | (EP) . |
| 0 485 823 | | 5/1992 | (EP) . |
| 0 514 594 | | 11/1992 | (EP) . |
| 0 549 900 | | 7/1993 | (EP) . |
| 0 553 805 | | 8/1993 | (EP) . |
| 0 553 806 | | 8/1993 | (EP) . |
| WO 94/03508 | | 2/1994 | (WO) . |

OTHER PUBLICATIONS

G. Fink, R. Mulhaupt, H. Brintzinger, Ziegler Catalysts, Springer–Verlag, pp. 35–39, 1995.*

* cited by examiner

Primary Examiner—David W. Wu
Assistant Examiner—R. Rabago
(74) Attorney, Agent, or Firm—Bryan Cave LLP

(57) ABSTRACT

Components of bimetallic catalysts for the polymerization of olefins comprising a compound of a transition metal M selected from Ti, V, Zr and Hf containing at least one M-$\pi$ bond, a compound of Ti or V not containing metal-$\pi$ bonds and a support comprising a magnesium halide. The catalysts obtained from the components of the invention are particularly suitable for gas-phase polymerization processes.

7 Claims, No Drawings

COMPONENTS AND CATALYSTS FOR THE POLYMERIZATION OF OLEFINS

This is a divisional of U.S. application Ser. No. 08/470,624, filed Jun. 6, 1995, now U.S. Pat. No. 5,691,264.

The present invention relates to components and catalysts for the polymerization of olefins, to a method for their preparation and to their use in the (co)polymerization of olefins $CH_2$=CHR, in which R is hydrogen or an alkyl, cycloalkyl or aryl radical with 1–10 carbon atoms.

The patent literature describes bimetallic catalysts comprising a compound of titanium or vanadium supported on a magnesium halide which is reacted with a metallocene compound containing at least one cyclopentadienyl ring coordinated on a transition metal selected from V, Ti, Zr and Hf.

Examples of such catalysts are described in USP 5,120,696, EP-A-447070 and 447071.

Bimetallic catalysts obtained by impregnating silica with a magnesium compound of the type $MgR_2$, where R is a hydrocarbon radical, and then treating the support with a compound of Ti, such as $TiCl_{4}$, optionally with $SiCl_4$, and thereafter with a metallocene compound, are known from U.S. Pat. No. 5,183,867 and from EP-A-514594.

Bimetallic catalysts obtained by treating $MgCl_2$ with halogenated compounds of Ti and then with titanocenes such as $Cp_2TiCl_2$ and bis(indenyl)$TiCl_2$ are known from EP-A-412750.

Catalysts obtained by treating carbonated compounds of Mg, such as alkylmagnesium carbonate, with $TiCl_4$ in the presence of a metallocene compound of Hf or Zr, are known from WO 94/03508.

Bimetallic catalysts comprising a titanium-based catalyst in which the Ti compound is supported on Mg halide, a metallocene compound and poly(methylaluminoxane) (MAO) are known from EP-A-436399.

The macroporosity of the solid components used in the preparation of the catalysts of the above cited prior art is not sufficiently high to allow their use in processes carried out in the gas phase. The above catalysts are characterized in that they give polymers, in particular polyethylene, with a narrow molecular weight distribution. As a consequence of the insufficient macroporosity, the metallocene compound is poorly fixed inside the particles of the support or of the component containing the titanium compound. Instead, it tends to be deposited on the surface. The catalyst obtained therefrom has poor activity in gas-phase polymerization processes. The presence of the metallocene compound and of the polymer layer that forms at the surface tends to prevent the access of the monomer to the active sites containing the titanium compound and to undermine its activity. The polymer particle that forms is inhomogeneous and frequently the outer layer comes off from it, giving rise to the formation of polymer in powder form with consequent difficulty in carrying out the process in the gas phase.

Components of bimetallic catalysts have now been found which are particularly suitable for gas-phase polymerization processes, the said components comprising non-metallocene compounds of Ti or V, metallocene compounds and/or their reaction products with the support uniformly dispersed in the particle.

The components of the catalysts of the invention comprise the product obtained by contacting:
(a) a compound of a transition metal M selected among Ti, V, Zr and Hf containing at least one M-π bond with a solid component comprising a compound of Ti or V not containing M-π bonds, and optionally an electron-donor compound supported on a Mg halide, or
(b) a compound of Ti or V not containing M-π bonds with a solid component comprising a compound of V, Ti, Zr or Hf containing at least one M-π bond supported on a Mg halide, or
(c) a compound of Ti or V not containing M-π bonds and a compound of V, Ti, Zr or Hf having at least one M-π bond with a support comprising a Mg halide, the component as in (a) and (b) and the support as in (c) being characterized in that they have a porosity (due to pores with radius up to 10000 Å, measured with the mercury porosimeter), greater than 0.3 $cm^3/g$, preferably between 0.4 and 1.5 $cm^3/g$.

The total porosity (mercury method) is generally between 0.6 and 4 $cm^3/g$. The porosity (due to pores with radius up to 10000 Å, measured with the mercury porosimeter) of component (a) is generally between 0.3 and 0.8 $cm^3/g$, whereas the total porosity is greater than 0.8 $cm^3/g$.

The surface area (mercury method) is generally between 10 and 100 $m^2/g$.

The porosity determined by the BET method depends on the type of solid component. In the case of solid component (b) and of support (c) the BET porosity is generally greater than 0.2 $cm^3/g$, and preferably between 0.3 and 1 $cm^3/g$; in the case of component (a) the porosity (BET) can be the same as that of component (b) or even lower. Values of 0.1 $cm^3/g$ or lower are possible in some cases.

The surface area (BET) of component (b) and of the support (c) is generally greater than 40 $m^2/g$, and is preferably between about 60 and 400 $m^2/g$; that of the support (c) can be as high as 500 $m^2/g$ or even higher.

The surface area (BET) of component (a) is generally between 20 and 400 $m^2/g$. When the porosity (BET) of component (a) is low (0.2 $cm^3/g$ or less) the surface area (BET) is also low (20–40 $m^2/g$).

The components (a) and (b) and the support (c) are preferably used in the form of spherical particles with mean diameter between about 10 and 150 microns.

Component (a) and the support (c) are prepared according to known methods. Suitable methods are described, for example, in EP-A-395083, EP-A-553806, U.S. Pat. No. 4,399,054, whose description with respect to the preparation method and to the characteristics of the products is herein incorporated by reference. A method of preparation of component (b) is described in Italian Application MI-94-A-001065.

The Mg halide, preferably Mg chloride, that can be used as support (c) or for preparation of the components (a) and (b), as well as having the characteristics of surface area and porosity stated above, may have the following additional characteristics.

The Mg halide can include, in smaller proportions, other components that act as co-supports or are used for improving the properties of the catalytic component. Examples of these components are $AlCl_3$, $SnCl_4$, Al $(OEt)_3$, $MnCl_2$, $ZnCl_2$, $VCl_3$ and Si $(OEt)_4$.

The Mg halide can be complexed with electron-donor compounds not containing active hydrogen in a quantity of up to about 30 mol %, preferably 5–15 mol % based on the Mg halide. Non-limiting examples of electron donors are ethers, esters and ketones.

The Mg halide can, in its turn, be supported on an inert support having area and porosity such that the obtained supported product has the values stated previously. Suitable inert supports can be metal oxides such as silica, alumina and silica-alumina, which have values of porosity (BET) greater than 0.5 $cm^3/g$ and of surface area (BET) greater than 200 $m^2/g$ and between, for example, 300 and 600 $m^2/g$.

Other possible inert supports are porous polymers such as polyethylene, polypropylene and polystyrene.

Partially crosslinked polystyrene, which has high values of surface area and porosity, is particularly suitable. Polystyrenes of this type are described in U.S. Pat. No. 5,139,985 whose description of the method of preparation and supporting of the Mg halide is herein included for reference. These polystyrenes generally have values of surface area (BET) between 100 and 600 m$^2$/g and of porosity (BET) greater than 0.15 cm$^3$/g.

Generally, the amount of Mg halide that can be supported is between 1 and 20% by weight based on the total. The preferred Mg halide is Mg chloride. The Mg halide can be supported according to known methods, starting from its solutions in solvents such as tetrahydrofuran or by impregnation of the inert support with solutions of the halide in an alcohol; the alcohol is then removed by reaction with a compound such as a trialkyl-Al or dialkylaluminium halide or silicon halides. The alcohols used generally have 1–8 carbon atoms.

A very suitable method for the preparation of Mg halides having the characteristics of porosity and area stated above consists of reacting spherulized adducts of MgCl$_2$ with alcohols, the said adducts containing from 0.5 to 3 mol of alcohol, with alkyl-Al compounds, in particular triethyl-Al, triisobutyl-Al and AlEt$_2$Cl.

A preparation of this type is described in U.S. Pat. No. 4,399,054 whose description is herein incorporated by reference.

In order to obtain supports with morphological characteristics particularly suitable for the gas-phase polymerization processes in a fluidized bed, it is advisable to carry out a controlled partial dealcoholation treatment on a MgCl$_2$/alcohol adduct containing about 3 mol of alcohol per MgCl$_2$ mol, prior to reaction with the alkyl-Al. A suitable method is described in European Patent Application EP-A-553806 to which reference is made for the description. The Mg halides thus obtained have a spheroidal form, average diameter lower than about 150 $\mu$m, and surface area (BET) greater than 60–70 m$^2$/g and generally between 60 and 500 m$^2$/g.

Other methods of preparation of the Mg halides suitable for preparing the components of the invention are those described in European Patent Application EP-A-553805 whose description is included here for reference.

The average dimensions of the crystallites of the Mg halide are generally lower than 300 Å and preferably lower than 100 Å.

The compound containing M-$\pi$ bonds (metallocene compound) and/or that of V and Ti not containing the said bonds (non-metallocene compound) is contacted with the solid components (a) or (b) or with the support (c) preferably working in hydrocarbon solvents such as hexane, heptane, benzene or toluene, at temperatures between room temperature and 120° C.

The metallocene compound and the non-metallocene compound that are not bound to the solid components are removed by filtration or similar methods. It is also possible to bring into contact a solution containing a predetermined amount of compound to be bound and then to evaporate the solvent.

The amount of metallocene compound present in the solid components is generally between 0.05 and 5% by weight expressed as metal. The amount is preferably between 0.1 and 2% by weight and more preferably between 0.3 and 1.5% by weight.

The amount of non-metallocene compound can reach values greater than 10–15% by weight expressed as metal.

In the case of the component obtained using support (c) or component (b), the amount, expressed as metal, of metallocene compound present is generally equal to 1 g for values of surface area (BET) between $10^4$ and $5 \cdot 10^5$ m$^2$.

In the case of component (a), the amount of metallocene compound, expressed as metal, can be greater than that of the components stated above, i.e. 1 g for surface area (BET) between 500 and 10000 m$^2$.

The metallocene compound can be supported using its solutions in hydrocarbon solvents. The metallocene compound is preferably used in solution in hydrocarbon solvents (benzene, toluene, heptane, hexane and the like) said solution also containing dissolved therein an alkyl-Al compound such as triisobutyl-Al, triethyl-Al and/or polyaluminoxane (MAO). The molar ratio of the alkyl-Al compound to the metallocene compound is greater than 2 and is preferably between 5 and 100.

By using these solutions it is possible to obtain catalysts having greater activity compared to those obtained using solutions of the metallocene compound not containing alkyl-Al compounds and/or MAO.

Useful metallocene compounds are selected from the compounds of a transition metal M selected from Ti, V, Zr and Hf containing at least one metal-w bond, and preferably comprising at least one ligand L coordinated on the metal M, said ligand L having a mono- or polycyclic structure with conjugated $\pi$ electrons. Said compound of Ti, V, Zr or Hf is preferably selected from the compounds having the structure:

   (I)

   (II)

   (III)

in which M is Ti, V, Zr or Hf; Cp$^I$ and Cp$^{II}$, same or different, are cyclopentadienyl groups or substituted cyclopentadienyl groups; two or more substituents on the said cyclopentadienyl groups can form one or more rings having from 4 to 6 carbon atoms; R$^1$, R$^2$, R$^3$, same or different, are hydrogen or halogen atoms, an alkyl or alkoxyl group with 1–20 carbon atoms, aryl, alkaryl or aralkyl with 6–20 carbon atoms, an acyloxy group with 1–20 carbon atoms, an allyl group, a substituent containing a silicon atom; A is an alkenyl bridge or one with structure selected from:

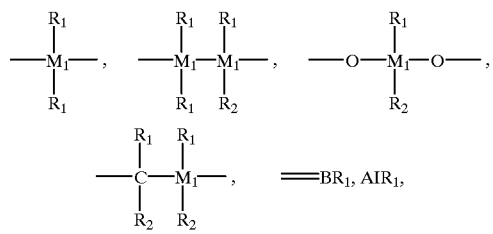

—Ge—, —Sn—, —O—, —S—, =SO, =SO$_2$, =NR$_1$, =PR$_1$ and =P(O)R$_1$, in which M$_1$ is Si, Ge, or Sn; R$_1$ and R$_2$, equal or different, are alkyl groups with 1–4 carbon atoms or aryl groups with 6–10 carbon atoms; a, b and c are, independently, integers from 0 to 4; e is an integer from 1 to 6 and two or more of the radicals R$^1$, R$^2$ and R$^3$ can form a ring. In the case where the Cp group is substituted, the substituent is preferably an alkyl group with 1–20 carbon atoms.

Representative compounds having formula (I) include: (Me$_5$Cp)MMe$_3$, (Me$_5$Cp)M(OMe)$_3$, (Me$_5$Cp)MCl$_3$, (Cp)

$MCl_3$, $(H_4Ind)MBenz_3$, $(Cp)MMe_3$, $(MeCp)MMe_3$, $(Me_3Cp)MMe_3$, $(Me_4Cp)MCl_3$, $(Ind)MBenz_3$, $(Cp)MBu_3$.

Representative compounds having formula (II) include: $(Cp)_2MMe_2$, $(Cp)_2MPh_2$, $(Cp)_2MEt_2$, $(Cp)_2MCl_2$, $(Cp)_2M(OMe)Cl$, $(Cp)_2M(OMe)_2$, $(MeCp)_2MCl_2$, $(Me_5Cp)_2MCl_2$, $(Me_5Cp)_2MMe_2$, $(Cp)(Me_5Cp)MCl_2$, $(Me_5Cp)_2MMeCl$, $(Me_5Cp)_2M(OMe)_2$, $(Me_3Cp)_2MCl_2$, $(Me_4Cp)_2MCl_2$, $(1\text{-}MeFlu)_2MCl_2$, $(BuCp)_2MCl_2$, $(Me_5Cp)_2M(OH)Cl$, $(Me_5Cp)_2M(OH)_2$, $(Me_5Cp)_2M(CH_3)Cl$, $(Me_5Cp)_2M(C_6H_5)_2$, $(Me_5Cp)_2M(C_6H_5)Cl$, $[(C_6H_5)Me_4Cp]_2MCl_2$, $(EtMe_4Cp)_2MCl_2$, $(Et_5Cp)_2MCl_2$, $(Ind)_2MCl_2$, $(Ind)_2MMe_2$, $(H_4Ind)_2MCl_2$, $(H_4Ind)_2MMe_2$, $\{[Si(CH_3)_3]Cp\}_2MCl_2$, $\{[Si(CH_3)_3]_2Cp\}_2MCl_2$, $(Me_4Cp)(Me_5Cp)MCl_2$.

Representative compounds of formula (III) include: $C_2H_4(Ind)_2MCl_2$, $C_2H_4(Ind)_2MMe_2$ $C_2H_4(H_4Ind)_2MCl_2$, $C_2H_4(H_4Ind)_2MMe_2$, $Me_2Si(Me_4Cp)_2MCl_2$, $Me_2Si(Me_4Cp)_2MMe_2$, $Me_2SiCp_2MCl_2$, $Me_2SiCp_2MMe_2$, $Me_2Si(Me_4Cp)_2MMeOMe$, $Me_2Si(Flu)_2MCl_2$, $Me_2Si(2\text{-}Et\text{-}5\text{-}iPrCp)_2MCl_2$, $Me_2Si(H_4Ind)_2MCl_2$, $Me_2Si(H_4Flu)_2MCl_2$, $Me_2SiCH_2(Ind)_2MCl_2$, $Me_2Si(2\text{-}Me\text{-}H_4Ind)_2MCl_2$, $Me_2Si(2\text{-}MeInd)_2MCl_2$, $Me_2Si(2\text{-}Et\text{-}5\text{-}iPr\text{-}Cp)_2MCl_2$, $Me_2Si(2\text{-}Me\text{-}5\text{-}EtCp)_2MCl_2$, $Me_2Si(2\text{-}Me\text{-}5\text{-}Me\text{-}Cp)_2MCl_2$, $Me_2Si(2\text{-}Me\text{-}4,5\text{-}benzoindenyl)_2MCl_2$, $Me_2Si(4,5\text{-}benzoindenyl)_2MCl_2$, $Me_2Si(2\text{-}Et\text{-}Ind)2MCl_2$, $Me_2Si(2\text{-}iPr\text{-}Ind)_2MCl_2$, $Me_2Si(2\text{-}t\text{-}butyl\text{-}Ind)MCl_2$, $Me_2Si\text{-}(3\text{-}t\text{-}butyl\text{-}5\text{-}MeCp)_2MCl_2$, $Me_2Si(3\text{-}t\text{-}butyl\text{-}5\text{-}MeCp)_2MMe_2$, $Me_2Si(2\text{-}MeInd)_2MCl_2$, $C_2H_4(2\text{-}Me\text{-}4,5\text{-}benzoindenyl)_2MCl_2$, $Me_2C(Flu)CpMCl_2$, $Ph_2Si(Ind)_2MCl_2$, $Ph(Me)Si(Ind)_2MCl_2$, $C_2H_4(H_4Ind)M(NMe_2)OMe$, isopropylidene-$(3\text{-}t\text{-}butyl\text{-}Cp)(Flu)MCl_2$, $Me_2C(Me_4Cp)(MeCp)MCl_2$, $Me_2\text{-}Si(Ind)_2MCl_2$, $Me_2Si(Ind)_2MMe_2$, $Me_2Si(Me_4Cp)_2MCl(OEt)$, $C_2H_4(Ind)_2\text{-}M(NMe_2)_2$, $C_2H_4(Me_4Cp)_2MCl_2$, $C_2Me_4(Ind)_2MCl_2$, $Me_2Si(3\text{-}Me\text{-}Ind)_2MCl_2$, $C_2H_4(2\text{-}Me\text{-}Ind)_2MCl_2$, $C_2H_4(3\text{-}Me\text{-}Ind)_2MCl_2$, $C_2H_4(4,7\text{-}Me_2\text{-}Ind)_2MCl_2$, $C_2H_4(5,6\text{-}Me_2\text{-}Ind)_2MCl_2$, $C_2H_4(2,4,7\text{-}Me_3Ind)_2MCl_2$, $C_2H_4(3,4,7\text{-}Me_3Ind)_2\text{-}MCl_2$, $C_2H_4(2\text{-}Me\text{-}H_4Ind)_2MCl_2$, $C_2H_4(4,7\text{-}Me_2\text{-}H_4Ind)_2MCl_2$, $C_2H_4(2,4,7\text{-}Me_3\text{-}H_4Ind)_2MCl_2$, $Me_2Si(_{4,7}\text{-}Me_2\text{-}Ind)_2MCl_2$, $Me_2Si(5,6\text{-}Me_2\text{-}Ind)_2MCl_2$, $Me_2Si(2,4,7\text{-}Me_3\text{-}H_4Ind)_2MCl_2$.

In the simplified formulae given above, the symbols have the following meanings: Me=methyl, Et=ethyl, iPr=isopropyl, Bu=butyl, Ph=phenyl, Cp=cyclopentadienyl, Ind=indenyl, $H_4Ind$=4,5,6,7-tetrahydroindenyl, Flu=fluorenyl, Benz=benzyl, M=Ti, Zr or Hf, preferably Zr.

Compounds of the type $Me_2Si(2\text{-}Me\text{-}Ind)_2ZrCl_2$ and $Me_2Si(2\text{-}Me\text{-}H_4Ind)ZrCl_2$ and their methods of preparation are described in European Patent Applications EP-A-485822 and 485820, the description of which is included here for reference.

Compounds of the type $Me_2Si(3\text{-}t\text{-}butyl\text{-}5\text{-}MeCp)_2ZrCl_2$ and of the type $Me_2Si(2\text{-}Me\text{-}4,5\text{-}benzoindenyl)ZrCl_2$ and their method of preparation are described respectively in U.S. Pat. No. 5132262 and in European Patent Application EP-A-549900, the description of which is included here for reference.

The non-metallocene compounds of Ti and V are generally selected from the halides and the halo alkoxides.

Examples of compounds of Ti that can be used are $TiCl_4$, $TiCl_3$ and $Ti(OR)_mX_n$ in which R is a hydrocarbon radical with 1–12 carbon atoms or a —COR group, X is a halogen and m+n is the valence of the titanium. Suitable V compounds are $VCl_3$, $VCl_4$, $VOCl_3$ and vanadyl halides.

The molar ratio between the metallocene and non-metallocene compounds in the solid components of the invention can vary over a wide range and is generally between 1:10 and 10:1.

The performance of the catalyst, particularly in terms of molecular weight distribution of the polymer obtained, depends on the aforementioned ratio. The higher the value of the ratio, the greater the capability of the catalyst to give polymers having narrow molecular weight distribution.

The components of the invention form, with alkyl-Al compounds or with poly(alkylaluminoxane) compounds or their mixtures, catalysts endowed with very high activity relatively to the Mg halide.

The alkyl-Al compound is generally selected from the compounds of formula $AlR_3$, in which R is an alkyl having 1–12 carbon atoms, and the aluminoxane compounds containing the repeating unit —$(R^4)AlO$—, in which $R^4$ is an alkyl radical containing from 1 to 8 carbon atoms, the said aluminoxane compounds containing from 1 to 50 repeating units having the formula described above. Typical examples of compounds having the formula $AlR_3$ are trimethyl-Al, triethyl-Al, triisobutyl-Al, tri-n-butyl-Al, trihexyl-Al and trioctyl-Al. Among the aluminoxane compounds, it is preferable to use MAO. Mixtures of alkyl-Al compounds, preferably triisobutyl-Al, and aluminoxane compounds, preferably MAO, are also used advantageously.

When the transition metal compound containing a M-π bond is of the type described in formulae (II) and (III), the compounds obtained from reaction between $AlR_3$ and $H_2O$ can be used advantageously in molar ratios between 0.01 and 0.5.

Generally, the molar ratio between the alkyl-Al compound and the transition metal is between 100 and 5000, preferably between 100 and 4000, more preferably between 500 and 2000.

It has been found, and this is a further aspect of the invention, that the components of the invention are able to give catalysts having very high activity even when the alkyl-Al compound used is a trialkyl-Al compound not containing MAO and similar poly(alkylaluminoxanes). In the catalysts of the state of the art, the presence of MAO and similar compounds is essential for obtaining catalysts with high activity.

The catalysts of the invention can be used for the (co)-polymerization of olefins $CH_2$=CHR in which R is hydrogen or an alkyl radical with 1–10 carbon atoms or an aryl.

They are used in particular for the polymerization of ethylene and its mixtures with a-olefins of the above stated type in which R is an alkyl radical.

The catalysts, especially those obtained from compounds of the type $Me_2Si(Me_4Cp)_2ZrCl_2$, $C_2H_4(Ind)_2ZrCl_2$ and $C_2H_4(H_4Ind)ZrCl_2$ are suitable for production of LLDPE (copolymers of ethylene containing smaller proportions, generally less than 20 mol %, of α-olefin $C_3$–$C_{12}$) characterized by relatively low density values relative to the content of α-olefin, by reduced solubility in xylene at room temperature and by molecular weight distribution Mw/Mn between about 2.5 and 5.

In the case of stereoregular polymerization of propylene or other α-olefins, the catalyst comprises, in addition to the non-metallocene Ti compound, one or more electron-donor compounds (internal and optionally also external) according to what is well known about stereospecific catalysts supported on Mg halides.

The metallocene compound that can be used in the case of the preparation of stereoregular polymers of α-olefins is for example of the type described in European Patent Applications EP-A-485823, EP-A-485820 and U.S. Pat. Nos. 5132262 and 5162278.

The following non-limiting examples are given to better illustrate the invention.

The properties mentioned in the text and reported in the examples are determined by the following methods.

Porosity and surface area with nitrogen: are determined according to the BET methodology (equipment used: SORPTOMATIC 1800 from Carlo Erba).

Porosity and surface area with mercury: are determined by immersing a known quantity of the sample in a known amount of mercury inside a dilatometer and then gradually increasing the pressure of the mercury by hydraulic means. The pressure of introduction of the mercury into the pores is a function of their diameter. Measurement is effected using a "Porosimeter 2000 series" porosimeter from Carlo Erba. The porosity, pore size distribution and surface area are calculated from the decrease of volume of the mercury and from the values of the applied pressure.

Size of the catalyst particles: is determined by a method based on the principle of the optical diffraction of monochromatic laser light with "Malvern Instr. 2600" apparatus. The average size is reported as P50.

Melt Index E (MIE): determined according to ASTM-D 1238, method E.

Melt Index F (MIF): determined according to ASTM-D 1238, method F.

Ratio of degrees (F/E): ratio between Melt Index F and Melt Index E.

Flowability: is the time taken for 100 g of polymer to flow through a funnel whose discharge hole has a diameter of 1.25 cm and whose walls are inclined at 200 to the vertical.

Bulk density: DIN 53194 Morphology and granulometric distribution of the polymer particles: ASTM-D 1921-63.

Fraction soluble in xylene: measured by dissolving the polymer in boiling xylene and determining the insoluble residue after cooling to 25° C.

Content of comonomer: percentage by weight of comonomer determined from the IR spectrum.

Density: ASTM-D 792.

Mean size of the crystallites of $MgCl_2$ [D(110)]: is determined by measuring the half-width of the (110) diffraction line that appears in the X-ray spectrum of the magnesium halide, applying the Scherrer's equation:

$$D(110)=(K \cdot 1.542 \cdot 57.3)/(B-b) \cos \theta,$$

in which:
K=constant (1.83 in the case of magnesium chloride);
B=half-width (in degrees) of the (110) diffraction line;
b=instrumental broadening;
θ=Bragg angle.

In the case of magnesium chloride, the (110) diffraction line appears at an angle 2θ of 50.2°.

EXAMPLES

Example 1

Preparation of the Support.

An adduct of magnesium chloride and alcohol was prepared following the method described in Example 2 of U.S. Pat. No. 4,399,054, but operating at 2000 rpm instead of at 10000 rpm. The adduct, containing about 3 mol of alcohol, had a mean size of about 60 μm with a dispersion of about 30–90 μm.

Preparation of the Titanium Catalyst.

The spherical support prepared according to the method described above was subjected to a heat treatment, in a stream of $N_2$, in the temperature range 50–150° C. until spherical particles were obtained having a residual alcohol content of about 35% (1.1 mol of alcohol per mole of $MgCl_2$).

300 g of this support was loaded into a 5000 cm³ reactor in suspension with 3000 cm³ of anhydrous hexane. While stirring, at room temperature, 130 g of $AlEt_3$ in hexane solution (107 g/l) were slowly introduced. It was heated to 60° C. and kept at this temperature for 60 min. Stirring was stopped, solid was allowed to settle, and the clear phase was separated. The treatment with $AlEt_3$ was repeated twice more in the same conditions. It was then washed 3 times with anhydrous hexane and dried at 50° C. The support thus obtained had the following characteristics:

| | |
|---|---|
| porosity (Hg) | 1.144 cm³/g |
| surface area (Hg) | 15.2 m²/g |
| residual EtO | 5.5% (by weight) |
| residual Al | 3.6% (by weight) |
| Mg | 20.4% (by weight) |

260 g of support were loaded into a 6000 cm³ reactor together with 3000 cm³ of anhydrous hexane. Whilst stirring, 242 g of $Ti(OBu)_4$ were introduced in 30 min at room temperature. Stirring was continued for 30 min and then 350 g of $SiCl_4$ diluted with 250 cm³ of hexane were introduced over a period of 30 min and at room temperature. It was heated to 65° C. in 40 min and the temperature was maintained for 3 hours, thereafter separating the liquid phase by sedimentation and siphoning. 7 washings were then effected with hexane (3000 cm³ each time), 3 at 60° C. and 4 at room temperature. The component in spherical form was dried at 50° C. under vacuum. The characteristics were as follows:

| | |
|---|---|
| Total titanium | 8.95% (by weight) |
| Mg | 10.55% (by weight) |
| Cl | 43.6% (by weight) |
| Al | 0.6% (by weight) |
| OEt | 11% (by weight) |
| OBu | 14.4% (by weight) |
| Residual hexane | 1.5% (by weight) |
| porosity (BET) | 0.108 cm³/g, 50% of which is due to pores with radius >350 Å |
| surface area (BET) | 28.6 m²/g |
| porosity (mercury) | 0.536 cm³/g for pores with radius from 0 to 10000 Å, 50% of which is due to pores with radius >1250 Å. In the range of pores with radius 0–300000 Å, 48% of the pores have a radius >10000 Å |
| surface area (mercury) | 12.8 m²/g. |

Preparation of the Zirconocene/Triisobutylaluminium Solution.

A reactor with a capacity of 2000 cm³, previously purged with $N_2$ at 90° C. and equipped with an anchor stirrer, was fed with 126 g of triisobutylaluminium (TIBAL) in hexane solution (100 g/liter) and 45.7 g of ethylene-bis(indenyl)Zr-dichloride (EBI). The system was stirred continuously in $N_2$ atmosphere at 20° C. for 2 hours. At the end of this period a clear solution was obtained.

Preparation of the Zirconium Catalyst.

A reactor with a capacity of 1000 cm³, previously purged with $N_2$ at 90° C. and equipped with an anchor stirrer, was fed with 500 cm³ of anhydrous hexane and 100 g of the titanium catalyst described above at 20° C., while stirring and in a $N_2$ atmosphere. 126 cm³ of the EBI/TIBAL solution were then introduced and the solution was heated at 40° C. for 2 hours. At the end of this period, after removal of the solvent, about 125 g of spherical catalyst were obtained with the following characteristics: Cl=41.95%; Mg=9.52%; Ti=7.2%; Zr=0.85%; residual solvent=7%.

Polymerization (HDPE).

In a glass flask that had been purged with $N_2$ at 90° C. for 3 hours, 0.42 g of MAO and 0.05 g of the catalyst described above were precontacted in 100 cm$^3$ of toluene for 5 minutes at 30° C. Then the whole was placed in a 4-liter autoclave, equipped with an anchor stirrer and purged with $N_2$ at 90° C. for 3 hours, containing 1.6 liters of hexane at 20° C. The temperature of the autoclave was raised to 75° C. and 7 bar of ethylene and 0.25 bar of $H_2$ were introduced. Polymerization was carried out for 1 hour, keeping the temperature and the ethylene pressure constant. Polymerization was stopped by instantaneous degassing of the autoclave and, after cooling to 20° C., the polymer slurry was discharged and the polymer was dried at 20° C. in $N_2$. 295 g of polyethylene were obtained in the form of spherical particles (yield 5900 g polyethylene/g cat) with the following characteristics: MIE=2; F/E=38; [η]=1.25; Mw/Mn=3.3.

Example 2

Polymerization (LLDPE).

In a glass flask that had been purged with $N_2$ at 90° C. for 3 hours, 0.05 g of the catalyst described in Example 1 and 0.42 g of MAO were precontacted in 100 cm$^3$ of toluene for 5 minutes at 20° C. Then the whole was placed in a 4-liter steel autoclave, equipped with an anchor stirrer and purged in $N_2$ at 90° C. for three hours, containing 800 g of propane at 30° C. The temperature of the autoclave was raised to 75° C. and 0.1 bar of $H_2$ was introduced and then, simultaneously, 7 bar of ethylene and 160 g of 1-butene. Polymerization was effected for 1 hour, keeping the temperature and the ethylene pressure constant. 195 g of ethylene-butene copolymer were obtained in the form of spherical particles (yield 3900 g copolymer/g cat) with the following characteristics: MIE=0.36; F/E=66; density=0.908; insoluble in xylene=85.3%; [η]=2.15; butene=13.8%.

Example 3

Polymerization (LLDPE).

0.05 g of the catalyst of Example 1 was treated in the same conditions as in Example 2, but using 0.95 g of triethyl-Al instead of 0.42 g of MAO. Ethylene and butene were then copolymerized as in Example 2 but using 2 bar of $H_2$ and 350 g of butene. 225 g of ethylene-butene copolymer were obtained in the form of spherical particles (yield 4500 g copolymer/catalyst) with the following characteristics: MIE=1.2; F/E=26.3; [η]=1.8; density=0.918; butene=8.2%; insoluble in xylene=88.3%; Mw/Mn=4.7.

Example 4

The support, the titanium catalyst and the zirconocene-TIBAL solution were prepared as in Example 1.

Preparation of the Zirconium Catalyst.

A reactor with capacity of 1000 cm$^3$, purged with $N_2$ at 90° C. and equipped with an anchor stirrer, was loaded with 500 cm$^3$ of anhydrous hexane and 100 g of the described above titanium catalyst at 20° C., while stirring and in $N_2$ atmosphere. 10 g of diisobutylphthalate were then introduced and the temperature was raised to 40° for 2 hours while stirring. At the end of this period the system was cooled to 20° C., 126 cm$^3$ of the EBI/TIBAL mixture were introduced, and the solution was heated at 40° C. for 2 hours, at the end removing the solvent by evaporation. About 125 g of spherical catalyst with the following characteristics were obtained: Cl=38.859; Mg=8.65%; Ti=6.5%; Zr=0.73%; Al=1.95%; residual solvent=4.2%.

Polymerization (HDPE).

0.05 g of the catalyst described above was precontacted as in Example 1; polymerization of ethylene was carried out in the same conditions as in Example 1. 300 g of polyethylene were obtained in the form of spherical particles (yield 6000 g polyethylene/g cat) with the following characteristics: MIE=6; F/E=40; [η]=1.

Example 5

Polymerization (HDPE).

0.05 g of the catalyst described in Example 4 was precontacted as in Example 1, but with 0.85 g of triethylaluminium (TEAL) instead of 0.42 g of MAO. Polymerization was carried out by introducing 2 bar of $H_2$ and 7 bar of ethylene for 1 hour at 75° C. 231 g of polymer was obtained in the form of spherical particles (4600 g polyethylene/g cat) with the following characteristics: [72]=2.2; MIE=0.4; F/E=27; Mw/Mn=6.6.

Example 6

Polymerization (LLDPE).

0.05 g of the catalyst described in Example 4 was used and the polymerization was carried out in the same conditions as in Example 3, using 300 g of butene instead of 350 g. 185 g of ethylene/butene copolymer was obtained in the form of spherical particles (yield 3700 g copolymer/g cat) with the following characteristics: MIE=0.5; F/E=26; [η]=2; density=0.919; butene=7.6%; Mw/Mn=4.5; insoluble in xylene=91.5%.

Example 7

The support and the titanium catalyst were prepared with the same procedure as in Example 1.

Preparation of the Zirconium Catalyst.

A 1000 cm$^3$ reactor, purged with $N_2$ at 90° C. and equipped with an anchor stirrer, was loaded with 300 cm$^3$ of anhydrous toluene and 60 g of the titanium catalyst described above at 20° C. while stirring and in $N_2$ atmosphere. 5.77 g of MAO dissolved in 100 cm$^3$ of toluene were then introduced. The mixture was heated at 40° C. for 2 hours while stirring. 3 washings were then carried out with 150 cm$^3$ of toluene at 40° C., at the end of which the solvent was removed by evaporation under vacuum. The solid thus obtained was redispersed in 400 cm$^3$ of toluene, 2.74 g of EBI were introduced and the mixture was heated at 40° C. for 4 hours. Thereafter, two washings were effected with anhydrous hexane at 20° C. and the solvent was removed by evaporation under vacuum. About 70 g of spherical catalyst with the following characteristics were obtained: Zr=0.66%; Ti=7.73%; Mg=10.91%; Al=2.67%; Cl=43.45%; residual solvent=3%.

Polymerization (LLDPE).

In a glass flask purged with $N_2$ at 90° C. for 3 hours, 0.05 g of the catalyst described above was precontacted with 1.45 g of triisobutylaluminium (TIBAL) in 50 cm$^3$ of anhydrous hexane for 5 minutes at 20° C. At the end of this period the whole was fed into a fluidized-bed gas-phase reactor with a volume of 35 liters, in which 7 bar of ethylene, 1 bar of hydrogen and 200 g of butene were present, at a temperature of 75° C. The reaction was carried out in the gas phase for 3 hours, keeping the temperature, the ethylene/butene ratio and the pressure constant. At the end, after degassing, 325 g of ethylene-butene copolymer were discharged in the form of spherical particles (yield 6500 g copolymer/g cat) with the following characteristics: MIE=1.5; F/E=22.7; [η]=1.67; density=0.917; insoluble in xylene=86%; Mw/Mn=7.2; mean diameter=2000 μm; bulk density=0.42 g/cm$^3$; flowability=16 seconds.

Example 8
Preparation of the Titanium Catalyst.

The spherical support prepared as in Example 1 was subjected to heat treatment, in a stream of $N_2$, in the temperature range 50–150° C. until spherical particles with a residual alcohol content of about 35% were obtained. 625 $cm^3$ of $TiCl_4$ were introduced, in a stream of nitrogen, into a 1-liter glass flask. At 0° C. and while stirring, 25 g of the partially de-alcoholated support were added. The mixture was then heated to 100° C. During the heating phase, diisobutyl phthalate (DIBP) was added, in a molar ratio Mg/DIBP=8, when the temperature reached 40° C. The temperature was kept at 100° C. for 2 hours. Stirring was then stopped and, after the solid settled, the still hot liquid phase was removed by siphoning. 550 $cm^3$ of $TiCl_4$ were added to the solid residue and heated at 120° C. for 1 hour while stirring. After stirring had been stopped, the hot liquid was removed by siphoning. The solid residue was washed 6 times with 200 $cm^3$ of hexane at 60° C. and 3 times at room temperature, and then dried at 50° C. in $N_2$ atmosphere. The characteristics of the product obtained were as follows:

| | |
|---|---|
| Ti = 2.15% | (by weight) |
| Mg = 19.5% | (by weight) |
| EtO = 0.3% | (by weight) |
| porosity (mercury) | 0.658 $cm^3$/g for pores with radius up to 10000 Å. Total porosity (mercury) was 1.33 $cm^3$/g. |

Preparation of the Zirconium Catalyst.

The procedure described in Example 1 was followed, using 100 g of the titanium catalyst described above. The system was kept at 40° C. for 6 hours and 3 washings were effected with anhydrous hexane before removing the solvent by evaporation under vacuum. About 112 g of spherical catalyst were obtained having the following characteristics: Zr=0.38%; Ti=1.9%; Mg=17.8%; Cl=59.8%; Al=0.82%; residual solvent=7.7%.

Polymerization (LLDPE).

0.05 g of the catalyst described above was used and the polymerization was carried out according to the procedure of Example 7, using 1.5 bar of $H_2$ instead of 1 bar and 170 g of butene instead of 200 g. 520 g of ethylene-butene copolymer were obtained in the form of spherical particles (10400 g copolymer/g catalyst) with the following characteristics: MIE=0.84; F/E=30.7; [η]=1.88; density=0.918; butene=9.6%; Mw/Mn=5.4; insoluble in xylene=84.7%; mean diameter=2300 µm; bulk density=0.43 $g/cm^3$; flowability=16 seconds.

Example 9
Polymerization of LLDPE.

0.05 g of the catalyst described in Example 8 was used and the polymerization was carried out as in Example 2 with the following changes: 1.45 g of TIBAL were used instead of 0.42 g of MAO, 2 bar of $H_2$ instead of 0.1 bar and 200 g of butene instead of 100 g. 565 g of ethylene-butene copolymer was obtained in the form of spherical particles (yield 11300 g copolymer/g catalyst) with the following characteristics: MIE=0.4; F/E=29.3; [η]=2.3; density=0.914; butene=10.5%; insoluble in xylene=87.2; Mw/Mn=4.6; mean diameter=2350 µm; the content of particles with diameter <500 µm is less than 0.1% and the content of particles with diameter >4000 µm is less than 0.1%.

Example 10
The support and the titanium catalyst were prepared according to the procedure in Example 8. The zirconocene/TIBAL solution was prepared according to the procedure in Example 1.

Preparation of the Zirconium Catalyst.

The procedure described in Example 8 was followed, using 63 $cm^3$ of the TIBAL/EBI solution instead of 126 $cm^3$. About 112 g of spherical catalyst were obtained with the following characteristics: Zr=0.3%; Ti=1.9%; Mg=17.6%; Cl=60%; Al=0.65%.

Polymerization (HDPE).

0.05 g of the catalyst described above was precontacted as described in Example 1, but with 1.45 g of TIBAL instead of 0.42 g of MAO; the polymerization was carried out using 2 bar of $H_2$ instead of 0.25 bar. 235 g of spherical polyethylene was obtained (yield 4700 g polyethylene/g catalyst) with the following characteristics: [η]=2; MIE=0.87; F/E=28.7; Mw/Mn=6.1.

Example 11
Polymerization (LLDPE).

Polymerization was carried out as in Example 9 using 0.05 g of the catalyst described in Example 10. 525 g of ethylene-butene copolymer was obtained (10500 g copolymer/g catalyst) with the following characteristics: insoluble in xylene=80.40%; MIE=0.5; F/E=47.2; [η]=2.11; density=0.9116; butene=11.4%.

Example 12
The support and the titanium catalyst were prepared according to the procedure in Example 8.

Preparation of the Methylalumoxane/Zirconocene Solution.

A 2000 $cm^3$ reactor, purged with $N_2$ at 90° C. and equipped with an anchor stirrer, was fed with 1000 $cm^3$ of anhydrous toluene, 63.5 g of MAO and 11.4 g of EBI. The system was stirred continuously in a nitrogen atmosphere for 2 hours. At the end of this period a clear solution was obtained.

Preparation of the Zirconium Catalyst.

A reactor with a capacity of 1000 $cm^3$, purged with $N_2$ at 90° and equipped with an anchor stirrer, was loaded with 500 $cm_3$ of anhydrous toluene and 100 g of the titanium catalyst described above at 20° C. while stirring and in $N_2$ atmosphere. Next, 200 $cm^3$ of the EBI/MAO solution were introduced and the solution was heated at 40° C. for 6 hours. At the end of this period the solvent was removed by evaporation, and about 136 g of spherical catalyst were obtained with the following characteristics: Zr=0.3%; Ti=1.6%; Mg=13.2%; Cl=45%; Al=3.25%.

Polymerization of LLDPE.

0.05 g of the catalyst described above was used and the polymerization was carried out as in Example 8, using 2 bar of $H_2$ instead of 1.5. 380 g of ethylene-butene copolymer were obtained in the form of spherical particles (yield 7600 g copolymer/g catalyst) with the following characteristics: MIE=1.4; F/E=28; [η]=1.65; density=0.915; insoluble in xylene=84%; butene=11%.

Example 13
Preparation of the Support.

An $MgCl_2$/EtOH adduct containing 3 mol of alcohol per mole of $MgCl_2$ was prepared according to the procedure described in Example 1. The spherical adduct thus obtained was subjected to heat treatment, in a stream of $N_2$, in the temperature range 50–150° C. until spherical particles were obtained, having an alcohol content of about 10%.

Preparation of the Zirconocene/Triisobutylaluminium Solution.

The solution was prepared by the same procedure as in Example 1, using 252 g of TIBAL instead of 126.

Preparation of the Catalyst.

A 1-liter reactor, purged with $N_2$ at 90° C. for three hours and equipped with an anchor stirrer, was fed with 250 cm³ of heptane and 50 g of the support described above. The system was cooled to 0° C., 280 cm³ of the zirconocene/TIBAL solution described above were introduced, and the system was stirred continuously for 30 minutes. At the end of this period 11.5 cm³ of $TiCl_4$ diluted in 20 cm³ of heptane were introduced. The temperature was raised to 80° C. in 30 minutes and the mixture was stirred continuously for 2 hours. The solid obtained after removing the solvent was washed 4 times with 200 cm³ of heptane at 80° C. and twice with 200 cm³ of hexane at 20° C. 61 g of a catalyst having the following composition were obtained: Cl=65.6%; Mg=10.3%; Ti=4.3%; Al=0.95%; Zr=0.8%.
Polymerization of LLDPE.

0.05 g of the catalyst described above was used and the polymerization was carried out as described in Example 9. 300 g of copolymer were obtained (600 g copolymer/g catalyst) with the following characteristics: MIE=0.1; F/E=38; butene=8.1%; density=0.918; insoluble in xylene=92.4%; [η]=2.46.

Example 14

Preparation of the Catalyst.

The procedure in Example 13 was followed, using toluene instead of heptane. About 59 g of catalyst were obtained with the following composition: Cl=63.4%; Mg=19.9%; Ti=2.95%; Al=0.6%; Zr=0.9%.
Polymerization of LLDPE.

0.05 g of the catalyst described above was used and the polymerization was carried out as in Example 7, using 2 bar of $H_2$ instead of 1. 485 g of copolymer were obtained (yield 9700 g copolymer/g catalyst) with the following characteristics: MIE=5.98; F/E=32.07; butene=13.3%; density=0.9065; insoluble in xylene=75.24%; [η]=1.23.

Example 15

Polymerization of LLDPE.

0.05 g of the catalyst described in Example 14 was used and the polymerization was carried out according to the procedure described in Example 9, using 0.42 g of modified MAO (Ethyl Corporation). 382 g of copolymer were obtained (yield 7500 g copolymer/g catalyst) with the following characteristics: MIE=0.2; F/E=38.5; butene=8.27%; density=0.914; insoluble in xylene=90.71%; [η]=2.27; Mw/Mn=5.1.

Example 16

Preparation of the Support.

A spherical support prepared as in Example 1 was subjected to heat treatment, in a stream of $N_2$, in the temperature range 50–150° C. until spherical particles with a residual alcohol content of about 35% were obtained. 2700 g of this support was introduced into a 60 l autoclave together with 38 l of hexane. Under stirring and at room temperature 11.6 l of a hexane solution containing 100 g/l of $AlEt_3$ were fed over 60 minutes. The temperature was raised to 50° C. over 60 minutes and was maintained at that temperature for a further 30 minutes whilst stirring. After the solid settled, the liquid phase was removed by siphoning; the treatment with $AlEt_3$ was repeated twice again under the same conditions. The spherical product obtained was washed three times with hexane and dried at 50° C. under vacuum. 40 liters of $TiCl_4$ were fed into a 72 l steel reactor equipped with a stirrer; at room temperature and whilst stirring, 1900 g of the above described support were introduced. The whole was heated to 100° C. over 60 minutes and these conditions were maintained for a further 60 minutes. The stirring was discontinued and after 30 minutes the liquid phase was separated from the settled solid. Two further treatments were carried out under the same conditions with the only difference that the first of these treatments was carried out at 120° C. and the second at 135° C. Thereafter 7 washings with hexane (about 19 liters each) were carried out, three of which at 60° C. and 4 at room temperature. After drying, 2400 g of component in the form of spherical particles were obtained.
Preparation of the Zirconocene/Triisobutylaluminium Solution.

Into a 500 cm³ reactor, previously purged with nitrogen at 90° C., equipped with a mechanical stirrer, 30 g of triisobutylaluminium in a hexane solution (100 g/l) and 10 g of ethylene-bis-(4,7-dimethylindenyl)-Zr-dichloride (EBDMI) were added. The whole was heated to 40° C. for 1 hour until a clear solution was obtained.
Preparation of the Zirconium Catalyst.

Into a 1000 cm³ reactor equipped with a mechanical stirrer, 500 cm³ of hexane and 100 g of the above described titanium catalyst were added at 20° C. in a $N_2$ atmosphere. Then 30 cm³ of the above described EBDMI/TIBAL solution was fed and the mixture heated to 40° C. for 4 hours; the obtained solid was washed 3 times with 200 cm³ of hexane at 40° C. and 4 times at 20° C. The solvent was then removed and about 104 g of catalyst was obtained having the following characteristics: Ti=9.16%; Mg=14.25%; Cl=69%; Al=1.95%; Zr=0.15%; EtO=0.3%.
Polymerization.

0.05 g of the above described catalyst was used in a polymerization process carried out as described in Example 10. 305 g of spherical form polymer was obtained (yield 6100 g polyethylene/g catalyst) having the following characteristics: MIE=0.88; F/E=52.3.

Example 17

Preparation of a Solution EBI/TIBAL.

The same procedure as in Example 1 was followed, feeding 158 g of TIBAL instead of 126 g.
Preparation of the Zirconium Catalyst.

The same procedure of Example 16 was followed, but feeding 33 cm³ of the above described EBI/TIBAL solution. 104 g of spherical catalyst was obtained with the following characteristics: Ti=9.20%; Mg=13.85%; Cl=67.5%; Zr=0.21%; Al=1.95%.
Polymerization.

0.05 g of the above described catalyst was used in a polymerization process carried out as described in Example 10. 290 g of spherical form polyethylene was obtained (yield 26 kg polyethylene/g catalyst) with the following characteristics: MIE=0.66; F/E=55.63; MW/Mn=14.2; [η]=1.89.

Example 18

Preparation of the Support.

The support was prepared according to the procedure of Example 13.
Preparation of the EBI/TIBAL Solution.

The same process described in Example i was followed but using 228 g of TIBAL instead of 126 g.
Preparation of the Zirconium/Titanium Catalyst.

Into a previously purged 1000 cm³ reactor, 250 cm³ of toluene and 50 g of the above described support were added at 0° C., followed by 200 cm³ of the EBI/TIBAL solution. The mixture was kept under these conditions for 15 minutes, after which 11.5 cm³ of $TiCl_4$ was added, the temperature was raised to 80° C. and the system was left to react for 2 hours. Stirring was discontinued, the solid was left to settle and the liquid was separated. The solid was washed four times with 200 cm of toluene at 80° C. and 3 times at 20°

C. 60 g of spherical catalyst was obtained with the following characteristics: Cl=63.4%; Mg=19.9%; Ti=2.95%; Al=0.6%; Zr=0.9%; EtO=2.7%.
Polymerization.

0.05 g of the above described catalyst was used in a polymerisation process carried out as described in Example 10. 295 g of spherical polyethylene was obtained (yield 5800 g polyethylene/g catalyst) having the following characteristics: MIE=0.24; F/E=40.7; Mw/Mn=8.89; [η]=2.35.

Example 19

Polymerization.

0.05 g of the catalyst described in Example 18, was used in the polymerisation process described in example 9, but using 0.42 g MAO instead of TIBAL. 380 g of copolymer was obtained (yield 7500 g copolymer/g catalyst) having the following characteristics: MIE=0.2; F/E=38.5; insolubility in xylene=90.71; butene=8.2; [η]=2.27; density=0.914; Mw/Mn=5.1.

Example 20

Preparation of the EBDMI/TIBAL Solution.

The process as in Example 18 was followed with the exception that EBI was substituted by the same amount of EBDMI.

Synthesis of the Zirconium and Titanium Catalyst.

The same procedure as described in Example 18 was followed; 60 g of spherical catalyst was obtained with the following characteristics: Cl=65.7%; Mg=18%; Ti=2%; Al=0.55%; Zr=0.61%.
Polymerization.

0.05 g of the catalyst was used in a polymerisation process carried out as described in Example 9. 533 g of spherical copolymer was obtained (yield 11 kg copolymer/g catalyst) having the following characteristics: insolubility in xylene= 94.2; MIE=0.72; F/E=26.9; density=0.915; [η]=1.84.

What is claimed is:

1. Process for the polymerization of olefins $CH_2$=CHR in which R is hydrogen or an alkyl, cycloalkyl or aryl radical with 1–10 carbon atoms, wherein a catalyst is used which comprises the product of the reaction of
   (a) a component comprising the product obtained by contacting:
      (i) a compound of a transition metal M selected among Ti, V, Zr and Hf containing at least one M-π bond with a solid component comprising a compound of Ti or V not containing M-π bonds and optionally an electron-donor compound supported on an Mg halide, or
      (ii) a compound of Ti or V not containing M-π bonds with a solid component comprising a compound of V, Ti, Zr or Hf containing at least one M-π bond supported on a Mg halide, or
      (iii) a compound of Ti or V not containing M-π bonds and a compound of V, Ti, Zr or Hf having at least one M-π bond with a support comprising a Mg halide,
      the component as in (i) and (ii) and the support as in (iii) being characterized in that they have a porosity (due to pores with radius up to 10000 Å, determined with a mercury porosimeter) greater than 0.3 cm³/g, with
   (b) an alkyl-Al compound selected from trialkyl-Al's, wherein the alkyl groups have from 1 to 12 carbon atoms and linear or cyclic aluminoxane compounds containing the repeating unit —($R_4$)AlO—, in which $R_4$ is an alkyl group with 1–8 carbon atoms or a cycloalkyl or aryl group with 6–10 carbon atoms and containing from 1 to 50 repeating units.

2. Polyolefins obtained by the process of claim 1.

3. Shaped articles obtained from the polymers of claim 2.

4. Process for the polymerization of olefins $CH_2$=CHR in which R is an alkyl, cycloalky or aryl radical with 1–10 carbon atoms in which the catalyst used is obtained by reacting an alkyl aluminum compound or an aluminoxane compound containing the repeating unit ($R^4$)AlO—, in which $R^4$ is an alkyl radical containing from 1 to 8 carbon atoms, with a component comprising the product obtained by contacting:
   (a) a compound of a transition metal M selected among Ti, V, Zr and Hf containing at least one M-π bond with a solid component comprising a compound of Ti or V not containing M-π bonds and optionally an electron-donor compound supported on an Mg halide, or
   (b) a compound of Ti or V not containing M-π bonds with a solid component comprising a compound of V, Ti, Zr or Hf containing at least one M-π bond supported on a Mg halide, or
   (c) a compound of Ti or V not containing M-π bonds and a compound of V, Ti, Zr or Hf having at least one M-π bond with a support comprising a Mg halide,
   the component as in (a) and (b) and the support as in (c) being characterized in that they have a porosity (due to pores with radius up to 10000 Å, determined with a mercury porosimeter) greater than 0.3 cm³/g, wherein the transition metal compound contains at least one ligand L coordinated on the metal M, having mono- or polycyclic structure containing conjugated π electrons, and further wherein the transition metal compound is chosen from compounds having the structure: $(Cp)_2MMe_2$, $(Cp)_2MPh_2$, $(Cp)_2MEt_2$, $(Cp)_2MCl_2$, $(Cp)_2M(OMe)_2$, $(Cp)_2M(OMe)Cl$, $(MeCp)_2MCl_2$, $(Me_5Cp)_2MCl_2$, $(Me_5Cp)_2MMe_2$, $(Me_5Cp)_2MMeCl$, $(Cp)(Me_5Cp)MCl_2$, $(1\text{-MeFlu})_2MCl_2$, $(BuCp)_2MCl_2$, $(Me_3Cp)_2MCl_2$, $(Me_4Cp)_2MCl_2$, $(Me_5Cp)_2M(OMe)_2$, $(Me_5Cp)_2M(OH)Cl$, $(Me_5Cp)_2M(OH)_2$, $(Me_5Cp)_2M(C_6H_5)_2$, $(Me_5Cp)_2M(CH_3)Cl$, $(EtMe_4Cp)_2MCl_2$, $[(C_6H_5)\ Me_4Cp]_2MCl_2$, $(Et_5Cp)_2MCl_2$, $(Me_5Cp)_2M(C_6H_5)Cl$, $(Ind)_2MCl_2$, $(Ind)_2MMe_2$, $(H_4Ind)_2MCl_2$, $(H_4Ind)_2MMe_2$, $(Me_4Cp)(Me_5Cp)MCl_2$, $\{[Si(CH_3)_3Cp\}_2MCl_2$, $\{[Si(CH_3)_3]_2Cp\}_2MCl_2$.

5. Process for the polymerization of ethylene and of its mixtures with olefins $CH_2$=CHR in which R is an alkyl, cycloalkyl or aryl radical with 1–10 carbon atoms in which the catalyst used is obtained by reacting an alkyl aluminum compound or an aluminoxane compound containing the repeating unit —($R^4$)AlO—, in which $R^4$ is an alkyl radical containing from 1 to 8 carbon atoms, with a component comprising the product obtained by contacting:
   (a) a compound of a transition metal M selected among Ti, V, Zr and Hf containing at least one M-π bond with a solid component comprising a compound of Ti or V not containing M-π bonds and optionally an electron-donor compound supported on an Mg halide, or
   (b) a compound of Ti or V not containing M-π bonds with a solid component comprising a compound of V, Ti, Zr or Hf containing at least one M-π bond supported on a Mg halide, or
   (c) a compound of Ti or V not containing M-π bonds and a compound of V, Ti, Zr or Hf having at least one M-π bond with a support comprising a Mg halide,
   the component as in (a) and (b) and the support as in (c) being characterized in that they have a porosity (due to pores with radius up to 10000 Å, determined with a mercury porosimeter) greater than 0.3 cm³/g, wherein the transition metal compound contains at least one ligand L coordinated on the metal M, having mono- or polycyclic structure containing conjugated T electrons, and further wherein the transition metal compound is chosen from compounds having the structure: $(Cp)_2MME_2$, $(Cp)_2MPh_2$, $(Cp)_2MEt_2$, $(Cp)_2MCl_2$, $(Cp)_2M(OMe)_2$, $(Cp)_2M(OMe)Cl$, $(MeCp)_2MCl_2$, $(Me_5Cp)_2MCl_2$, $(Me_5Cp)_2MME_2$, $(Me_5Cp)_2MMeCl$, $(Cp)(Me_5Cp)MCl_2$, $(1\text{-MeFlu})_2MCl_2$, $(BuCp)_2MCl_2$, $(Me_3Cp)_2MCl_2$, $(Me_4Cp)_2MCl_2$, $(Me_5Cp)_2M(OMe)_2$, $(Me_5Cp)_2M(OH)Cl$, $(Me_5Cp)_2M(OH)_2$, $(Me_5Cp)_2M(C_6H_5)_2$, $(Me_5Cp)_2M(CH_3)Cl$, $(EtMe_4Cp)_2MCl_2$, $[(C_6H_5)Me_4Cp]_2MCl_2$, $(Et_5Cp)_2MCl_2$, $(Me_5Cp)_2M(C_6H_5)Cl$, $(Ind)_2MCl_2$, $(Ind)_2MMe_2$, $(H_4Ind)_2MCl_2$, $(H_4Ind)_2MMe_2$, $(Me_4Cp)(Me_5Cp)MCl_2$, $\{[Si(CH_3)_3]Cp\}_2MCl_2$, $\{[Si(CH_3)_3]_2Cp\}_2MCl_2$.

6. Ethylene polymers obtained by the process of claim 5.

7. Process for the polymerization of olefins $CH_2=CHR$, where R is hydrogen or an alkyl, cycloalkyl or aryl radical having 1–10 carbon atoms, carried out in the presence of a catalyst comprising:

(A) a solid component comprising the product obtained by contacting:

(a) a compound of a transition metal M chosen among Ti, V, Zr and Hf containing at least one M-$\pi$ bond with a solid component comprising a compound of Ti or V not containing M-$\pi$ bonds and optionally an electron-donor compound, which are supported on a Mg halide, or (b) a compound of Ti or V not containing M-$\pi$ bonds with a solid component comprising a compound of V, Ti, Zr or Hf containing at least one M-$\pi$ bond supported on a Mg halide, or (c) a compound of Ti or V not containing M-$\pi$ bonds and a compound of V, Ti, Zr or Hf having at least one M-$\pi$ bond with a support comprising a Mg halide , the component (a) and (b) and the support as in (c) being characterized in that they possess a porosity (determined with the mercury porosimeter, corresponding to pores with radius up to 10000 Å) greater than 0.3 $cm^3/g$;

(B) a trialkyl-Al compound.

* * * * *

UNITED STATES PATENT AND TRADEMARK OFFICE
CERTIFICATE OF CORRECTION

PATENT NO. : 6,291,607 B1
DATED : September 18, 2001
INVENTOR(S) : Mario Sacchetti et al.

It is certified that error appears in the above-identified patent and that said Letters Patent is hereby corrected as shown below:

<u>Title page,</u>
Item [56], References Cited, FOREIGN PATENT DOCUMENTS, there are duplicate entries for three of the listed documents. Therefore, please delete "318048 5/1989 (EP)," "412750 2/1991 (EP)," and "447070 9/1991 (EP).";

<u>Column 17,</u>
Line 3, "T" should be -- $\pi$ --.

Signed and Sealed this

Thirtieth Day of April, 2002

*Attest:*

*Attesting Officer*

JAMES E. ROGAN
*Director of the United States Patent and Trademark Office*